United States Patent
Lee et al.

(10) Patent No.: US 7,687,575 B2
(45) Date of Patent: Mar. 30, 2010

(54) PROPYLENE ELASTOMER-CONTAINING ADHESIVE BLENDS

(75) Inventors: Chun D. Lee, Cincinnati, OH (US); Timothy S. Schloemer, Cincinnati, OH (US)

(73) Assignee: Equistar Chemicals, LP, Houston, TX (US)

(*) Notice: Subject to any disclaimer, the term of this patent is extended or adjusted under 35 U.S.C. 154(b) by 204 days.

(21) Appl. No.: 11/499,133

(22) Filed: Aug. 3, 2006

(65) Prior Publication Data

US 2008/0032148 A1 Feb. 7, 2008

(51) Int. Cl.
*C08L 51/06* (2006.01)

(52) U.S. Cl. .................. 525/78; 428/461; 428/515; 428/516

(58) Field of Classification Search .................. 525/78; 428/461, 515, 516
See application file for complete search history.

(56) References Cited

U.S. PATENT DOCUMENTS

| | | | |
|---|---|---|---|
| 3,970,719 A | 7/1976 | Edmonds, Jr. | |
| 4,039,632 A | 8/1977 | Edmonds, Jr. | |
| 4,087,587 A | 5/1978 | Shida et al. | |
| 4,298,712 A | 11/1981 | Machonis, Jr. et al. | |
| 4,487,885 A | 12/1984 | Adur et al. | |
| 4,774,144 A | 9/1988 | Jachec et al. | |
| 5,017,714 A | 5/1991 | Welborn, Jr. | |
| 5,324,800 A | 6/1994 | Welborn, Jr. et al. | |
| 5,324,820 A | 6/1994 | Baxter | |
| 5,367,022 A | 11/1994 | Kiang et al. | |
| 6,171,933 B1 | 1/2001 | Xu et al. | |
| 6,171,993 B1 | 1/2001 | Mavridis et al. | |
| 6,207,754 B1 | 3/2001 | Yu | |
| 6,642,316 B1 | 11/2003 | Datta et al. | |
| 6,852,424 B2 | 2/2005 | Dharmarajan et al. | |
| 2006/0100347 A1* | 5/2006 | Ouhadi et al. | 524/502 |
| 2007/0251572 A1* | 11/2007 | Hoya et al. | 136/256 |
| 2007/0277450 A1* | 12/2007 | Raulie | 52/90.1 |

FOREIGN PATENT DOCUMENTS

| | | |
|---|---|---|
| WO | WO 98/32598 | 7/1998 |
| WO | WO 9832598 | 7/1998 |
| WO | WO 00/37553 | 6/2000 |
| WO | WO 0037553 | 6/2000 |
| WO | WO 2006/057361 | 6/2006 |
| WO | WO 2006057361 * | 6/2006 |
| WO | WO 2007/002177 | 1/2007 |
| WO | WO 2007002177 | 1/2007 |

OTHER PUBLICATIONS

Kirk-Othmer's *Encyclopedia of Chemical Technology*, 3rd Edition, pp. 453-467. *Encyclopedia of Polymer Science and Engineering*: vol. 13, pp. 464-530.
Ross, J.F., et al.: "An Improved Gas-Phase Polypropylene Process," *Ind. Eng. Chem. Prod. Res. Dev.* 24: pp. 149-154 (1985). Dana, S., et al.: "Polyolefin Elastomers with Isotactic Propylene Crystallinity;" *Rubber World*, Oct. 2003: pp. 55-67.
Kirk-Othmer's *Encyclopedia of Chemical Technology*, 3rd Edition, pp. 453-467.
*Encyclopedia of Polymer Science and Engineering*: vol. 13, pp. 464-530.
Ross, J.F., et al.: "An Improved Gas-Phase Polypropylene Process;" *Ind. Eng. Chem. Prod. Res Dev.* 24: pages 149-154 (1985).
Dana, S., et al.: "Polyolefin Elastomers with Isotactic Propylene Crystallinity;" *Rubber World*, Oct. 2003: pp. 55-67.

* cited by examiner

*Primary Examiner*—Jeffrey C Mullis
(74) *Attorney, Agent, or Firm*—Shao-Hua Guo; Gerald A. Baracka

(57) ABSTRACT

Adhesive blends suitable for use as tie-layer adhesives for a variety of substrates used in multi-layer film and sheet constructions are provided. The adhesive blends contain a polyolefin base resin, a functionalized polyolefin and a propylene elastomer containing isotactic propylene crystallinity.

15 Claims, No Drawings

PROPYLENE ELASTOMER-CONTAINING ADHESIVE BLENDS

FIELD OF THE INVENTION

The invention relates to adhesive blends having improved properties comprised of a polyolefin base polymer, an acid or acid derivative functionalized polyolefin and a propylene elastomer containing isotactic propylene components.

DESCRIPTION OF THE PRIOR ART

Adhesive blends, sometimes referred to as tie-layer adhesives, designed to improve adhesion between polyolefins and dissimilar substrates, such as polyamides, EVOH copolymers, metals and the like, are well known. These adhesive blends typically have a polyolefin base resin as the predominant component and a modified polyolefin containing carboxylic acid or anhydride functionality, e.g., polymers grafted with maleic anhydride, as the minor component.

Optionally, one or more other polymeric materials, including elastomers which may be compatible with the base resin and functionalized polyolefin, can be included in the adhesive blends. Poly(isobutylene), ethylene-propylene copolymers (EPRs) and ethylene-propylene-diene terpolymers (EPDMs) are the most commonly used elastomers. EPR and EPDM rubbers have ethylene as the predominant monomer, i.e., ethylene contents of these elastomers is most typically 60 weight percent (wt. %) or greater.

Representative adhesive blends of the above types are described in U.S. Pat. Nos. 4,087,587; 4,298,712; 4,487,885; 4,774,144 and 5,367,022.

In view of the numerous and diverse uses for adhesive blends of the above types, new and improved formulations are constantly being sought. It would be highly desirable if new formulations were available which could advantageously be employed for metal bonding, for coextruded films and for rigid applications. These and other objectives are achieved with the adhesive blends of the present invention which are described in detail to follow.

SUMMARY OF THE INVENTION

The invention relates to adhesive blends comprised of 25 to 85 weight percent, based on the total weight of the blend composition, crystalline or semi-crystalline polyolefin; 2.5 to 25 weight percent, based on the total weight of the blend composition, modified polyolefin containing acid or acid derivative functionality; and 2.5 to 40 weight percent, based on the total weight of the blend composition, propylene elastomer having a propylene content of 60 mole percent or greater and containing isotactic propylene components.

Also disclosed are multi-layer polymer or metal films or sheets having the adhesive blends adhesively bonded thereto.

Particularly useful adhesive blends are those wherein the crystalline or semi-crystalline polyolefin base resin is selected from the group consisting of ethylene homopolymers, propylene homopolymers, ethylene-propylene copolymers, ethylene-$C_{4-8}$ α-olefin copolymers, copolymers of ethylene and vinyl carboxylate and copolymers of ethylene and acrylic or methacrylic acids and esters having greater than 30 weight percent crystallinity, the modified polyolefin is an ethylene homopolymer, ethylene-$C_{3-8}$ α-olefin copolymer, propylene homopolymer or propylene-ethylene copolymer having 0.1 to 5 weight percent ethylenically unsaturated carboxylic acid or acid derivative incorporated in the polymer chain by copolymerization or grafted onto the polymer backbone and the propylene elastomer contains 70 mole percent or greater propylene and has a density from 0.850 to 0.875 g/cm³ and melt flow rate from 2 to 100 g/10 min.

In another highly useful embodiment of the invention the blends additionally contain from 5 to 35 weight percent polymer selected from the group consisting of ethylene-propylene copolymer rubbers, ethylene-propylene-diene terpolymer rubbers and ethylene-$C_{4-8}$ α-olefin copolymer plastomers.

DETAILED DESCRIPTION OF THE INVENTION

Adhesive blends of the invention are comprised of a polyolefin base resin, which can be a single polyolefin or a mixture of two or more polyolefins, a modified polyolefin and an elastomeric propylene polymer. The modified polyolefin, also referred to herein as the functionalized polyolefin or functionalized component, contains acid or acid derivative functionality. The propylene polymer elastomer (PPE), also referred to herein as the elastomeric component or rubber component, is comprised of at least 60 mole percent propylene and contains isotactic propylene. The terms rubber and elastomer are used interchangeably herein. The PPE can be the sole elastomeric component in the adhesive blend or it can be combined with other elastomeric materials.

Polyolefins useful for the base resin include crystalline and semi-crystalline ethylene homopolymers, propylene homopolymers, copolymers of ethylene and propylene and copolymers of ethylene and $C_{4-8}$ α-olefins, copolymers of ethylene and vinyl carboxylates and copolymers of ethylene and acrylic and methacrylate acids and esters. For the purpose of this invention, crystalline and semi-crystalline resins are defined as those having greater than 30 percent crystallinity determined by either wide angle x-ray diffraction or differential scanning calorimetry.

Ethylene homopolymers and ethylene-$C_{4-8}$ α-olefin copolymers include low density polyethylene (LDPE), linear low density polyethylene (LLDPE), medium density polyethylene (MDPE) and high density polyethylene (HDPE). LDPE and LLDPE are defined as having densities in the range 0.910 to 0.930 g/cm³. MDPE is defined as having a density of 0.930 to 0.945 g/cm³. HDPE is defined as having a density of 0.945 g/cm³ and above and, more typically, from 0.945 to 0.969 g/cm³. Densities are determined in accordance with ASTM D 792. The base resin can be a mixture of two or more of the above-mentioned polyolefins. The particular base resin used is primarily determined by the intended end-use application of the adhesive blend.

The ethylene homopolymers and copolymers will have melt indexes (MI's) from about 0.01 to 400 g/10 min and, more preferably, from 0.1 to 200 g/10 min. Still more preferred are homopolymers and copolymers with MIs from 1 to 100 g/10 min. MIs are determined using ASTM D 1238-01, Condition 190/2.16.

Compositions wherein the polyolefin component is HDPE or LLDPE are particularly advantageous. HDPEs typically have greater than 60% crystallinity and LLDPEs typically have greater than 40% crystallinity.

Other crystalline and semi-crystalline polyolefins which can be utilized as the base resin component for the adhesive blend of the invention include copolymers of ethylene with comonomers containing polar groups such as acrylic acid and methacrylic acid and $C_{1-4}$ alkyl esters thereof and vinyl esters of $C_{24}$ aliphatic acids. Such copolymers will typically contain 1 to 45 wt. % and, more preferably, 3 to 35 wt. % of the polar comonomer. Included by way of illustration are ethylene-vinyl acetate copolymers, ethylene-ethyl acrylate copolymers, ethylene-n-butyl acrylate copolymers, ethylene-acrylic acid copolymers, ethylene-methylacrylic acid copolymers and ethylene-methyl methacrylate copolymers.

Ethylene copolymers having a network structure believed to be formed, at least in part, by association of hard and soft phases present in the resin may also be advantageously used. Ethylene copolymers having a network structure and the processes by which they are prepared and characterized are described in detail in U.S. Pat. No. 6,171,993 which is incorporated herein in its entirety by reference.

Useful propylene polymers can include crystalline and semi-crystalline homopolymers of propylene, i.e., polypropylene (PP), and crystalline and semi-crystalline copolymers of propylene with up to about 30 wt. % ethylene. Propylene polymers of these types are known and are commercially available. The propylene polymer resins, which can vary in melt flow rate (MFR) and physical properties, can be employed as the sole base or resin as one of the components of the base resin.

Copolymers of propylene with ethylene can be random or block. Numerous polymerization procedures are described in the prior art for the preparation of random and block copolymers. Block copolymers, for example, can be made in accordance with the processes of U.S. Pat. Nos. 3,970,719 or 4,039,632.

Random copolymers will generally contain from 1 to 10 wt. % ethylene and, more preferably, from 1 to 5 wt. % ethylene. Block copolymers will generally contain from 5 to 25 wt. % ethylene and, more preferably, from 5 to 20 wt. % ethylene. Random and block propylene copolymers generally have crystallinity contents of from 45 percent to 65 percent and, more typically, from 50 to 65 percent. Small amounts of other polymerizable monomers may be included with the propylene and ethylene if desired.

Propylene homopolymers and copolymers of the above types are generally discussed in Volume 16 of Kirk-Othmer's *Encyclopedia of Chemical Technology,* 3rd Edition, pp 453-467 and in Volume 13 of *Encyclopedia of Polymer Science and Engineering,* 1988, pp 464-530, the contents of which are incorporated herein by reference.

Still another type of propylene copolymer which can be used for the base resin are the so-called impact copolymers. Impact copolymers are intimate mixtures comprised of a continuous crystalline phase (propylene homopolymer) having an amorphous or rubbery phase (ethylene-propylene copolymer) dispersed therein. While impact copolymers can be produced by physically blending the individual polymer components, they are most commonly produced in gas-phase, stirred-bed polymerization processes which utilize two reactors connected in series and using high activity supported transition metal catalysts. Propylene homopolymer is produced in the first reactor and then introduced to the second reactor where additional propylene, ethylene, hydrogen and catalyst, as necessary, are metered to produce the intimate physical mixtures which comprise the propylene-ethylene impact copolymers. Gas phase polymerizations of this type are described in the article by Ross, et al., entitled "An Improved Gas-Phase Polypropylene Process" in *Ind. Eng. Chem. Prod. Res. Dev.* 1985, 24: 149-154, which is incorporated herein by reference.

The acid or acid derivative functionalized polyolefin utilized with the above-described polyolefin base resin to obtain the adhesive blends of the invention is produced by copolymerizing an acid or acid derivative monomer with an α-olefin or α-olefin mixture or by grafting the monomer onto a polyolefin, e.g., polyethylene.

Acid or acid derivative monomers copolymerized or grafted to obtain the modified polyolefin are ethylenically unsaturated carboxylic acids or acid derivatives, such as acid anhydrides, esters, salts or the like. Useful monomers include but are not limited to: acrylic acid, methacrylic acid, maleic acid, fumaric acid, itaconic acid, citraconic acid, mesaconic acid, maleic anhydride (MAH), 4-methyl cyclohex-4-ene-1, 2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, bicyclo (2.2.1)hept-5-ene-2,3-dicarboxylic acid anhydride, tetrahydrophthhalic anhydride, norborn-5-ene-2,3-dicarboxylic acid anhydride, and x-methylbicyclo(2.2.1)hept-5-ene-2,3-dicarboxylic acid anhydride(XMNA).

Modified polyolefins obtained by copolymerization can include copolymers of $C_{2-8}$ α-olefins, particularly ethylene, with the above-defined acid or acid derivative monomers. Copolymers of ethylene with acrylic acid, methacrylic acid, maleic acid, fumaric acid and MAH can be advantageously employed.

In a preferred embodiment, the functionalized, i.e., modified, polyolefin is obtained by grafting an ethylenically unsaturated carboxylic acid or derivative, particularly MAH, onto a polyolefin backbone. The grafting may be accomplished using known procedures in solution, in a fluidized bed reactor, by melt grafting or by irradiation grafting. As used herein, the term grafting denotes covalent bonding of the grafting monomer to the polymer chain.

Highly useful modified polyolefins for the adhesive blends of the invention are conveniently prepared by grafting the polyolefin in the substantial absence of solvent. This can be accomplished in a shear-imparting reactor, such as an extruder/reactor. Twin screw extruder/reactors such as those manufactured by Coperion (formerly Werner-Pfleiderer) under the designations ZSK-53, ZSK-83 and ZSK-92 are commonly used. A free radical generating catalyst, such as an organic peroxide catalyst, can be employed but is not necessary. The grafting reaction is carried out at a temperature selected to minimize or avoid rapid vaporization and consequent losses of the graft monomer and any catalyst that may be employed. The graft monomer concentration in the reactor is typically about 1 to about 5 wt. % based on the total reaction mixture weight. A temperature profile where the temperature of the polyolefin melt increases gradually through the length of the extruder/reactor up to a maximum in the grafting reaction zone and then decreases toward the reactor exit is preferred. The maximum temperature within the reactor should be such that significant vaporization losses and/or premature decomposition of any peroxide catalyst are avoided. For example, if di-t-butyl peroxide and 2,5-dimethyl-2,5-di-(t-butylperoxy) hexane are used, temperatures within the reactor are maintained at or below about 220° C. Examples of useful peroxide catalysts include: 1,1-bis(t-butylperoxy)cyclohexane; n-butyl-4,4-bis(t-butylperoxy-valerate); 1,1-bis (t-butylperoxy)-3,3,5-trimethylcyclohexane; 2,2-bis(t-butylperoxy)butane; dicumylperoxide; t-butylcumylperoxide; α,α'-bis(t-butylperoxy-preoxy-isopropyl)benzene; di-t-butylperoxide; 2,5-dimethyl-2,5-di(t-butylperoxy) hexane; and the like. The grafting monomer and any catalyst used are preferably added in neat form to the extruder/reactor.

Polyolefins grafted in accordance with the above procedures include homopolymers and copolymers of ethylene and propylene or mixtures thereof. Particularly useful are ethylene homopolymers, copolymers of ethylene with $C_{3-8}$ α-olefins, propylene homopolymers and propylene-ethylene copolymers, including random propylene-ethylene copolymers, block copolymers of propylene and ethylene and the so-called impact ethylene-copolymers. The polyolefin used for grafting may be the same or different from that used for the base resin. Graft monomer contents, i.e., the amount of unsaturated acid or acid derivative reacted with the polyolefin, generally range from about 0.1 up to about 5 wt. %. Highly useful modified polyolefins for the invention have from 0.5 to 4 wt. % graft monomer reacted. In one highly useful embodiment of the invention, HDPE, LLDPE and impact copolymers are grafted with MAH. The MI of the MAH grafted component will typically range from 0.1 to 200 g/10 min. MIs of the modified polyolefin are most preferably in the range 0.5 to 100 g/10 min.

Propylene polymer elastomers employed to obtain the adhesive blends of the invention having improved properties are propylene-ethylene copolymers containing at least 60 mole percent propylene and, more preferably, 70 mole percent or more propylene. This is in contrast to the EPR and EPDM rubbers heretofore employed which are comprised primarily of ethylene and contain less than 50 mole percent and, more typically, less than 40 mole percent propylene. Whereas the EPRs and EPDMs are amorphous or contain only small amounts of ethylene crystallinity, PPEs utilized for the present invention contain isotactic propylene crystallinity as a result of the presence of long propylene sequences formed within the polymer chain. These long propylene sequences are the result of the polymerization procedures and metallocene catalysts used to produce the PPEs. Unique properties of the PPEs are attributed to interactions between the crystalline segments within the polymer molecules. This interaction, referred to as virtual crosslinking, is significant under ambient conditions producing high viscosities and low deformation but diminishes at elevated temperatures so that the PPEs are easily processed. PPEs and their characteristics are discussed in detail in "Polyolefin Elastomers with Isotactic Propylene Crystallinity" by S. Dana, et al., *Rubber World*, October 2003, pp. 55-67, the teachings of which are incorporated herein by reference.

PPEs useful for the improved adhesive blends of the invention have densities in the range 0.840 to 0.890 g/cm$^3$ and MFRs from 1 to 500 g/10 min. More preferably, densities and MFRs of the PPEs range from 0.850 to 0.875 g/cm$^3$ and from 2 to 100 g/10 min, respectively. Densities are measured on compression molded specimens and MFRs are determined in accordance with ASTM D 1238, Condition 230/2.16. Elastomeric products of the above types are commercially available from Exxon Mobil Chemical under the designation Vistamaxx™ specialty elastomers.

Adhesive blends of the invention contain 25 to 85 wt. % base resin, 2.5 to 25 wt. % modified polyolefin and 2.5 to 40 wt. % PPE. Adhesive blends comprising 40 to 80 wt. % base resin, 4 to 20 wt. % modified polyolefin and 4 to 30 wt. % PPE, are particularly useful. The blends may also contain other resin components and conventional additives. When present optional resin components will generally not exceed 45 wt. % and, more typically, are present from about 1 to 40 wt. %. Highly useful adhesive formulations contain 5 to 35 wt. % optional resin components. All of the above weight percentages are based on the total weight of the adhesive blend.

Optional resin components include polymers containing less than 30 percent crystallinity, referred to herein as low crystallinity polymers, and elastomers. These include, for example, EPRs, EPDMs, chlorinated copolymers of isobutylene and isoprene, copolymers of butadiene and styrene, copolymers of isoprene and styrene, block copolymers butadiene and styrene, block copolymers of isoprene and styrene, block copolymers of isoprene and vinyl toluene, hydrogenated block copolymers of butadiene and styrene, hydrogenated block copolymers of isoprene and styrene, copolymers of acrylonitrile and butadiene, copolymers of methacrylonitrile and butadiene, copolymers of acrylonitrile and isoprene, copolymers of methacrylonitrile and isoprene, ethylene-vinyl acetate copolymers and the like. Ethylene-propylene copolymer rubbers, ethylene-propylene-diene terpolymer rubbers and ethylene-C$_{4-8}$ α-olefin copolymer plastomers are especially advantageous optional components.

Plastomers employed for the blends are produced using metallocene or "single site" catalysts having at least one cyclopentadienyl or analogous ligand coordinated to a transition metal cation. They are particularly useful optional components when formulating adhesive blends of the invention. Metallocene catalysts and polymerization processes are described in U.S. Pat. Nos. 5,017,714 and 5,324,800 which are incorporated herein by reference. Plastomers which can be used include copolymers of ethylene and C$_{4-8}$ α-olefin comonomers wherein ethylene comprises from about 87 to about 97.5 mole % and the α-olefin comprises about 2.5 to 13 mole % of the plastomer. Plastomers typically have densities from 0.86 to 0.92 g/cm$^3$. Most preferably, plastomer densities will be from 0.85 to 0.90 g/cm$^3$. Copolymers of ethylene and butene-1, hexene-1 and octene-1 are particularly useful plastomers. Plastomer copolymers of the above type are commercially available and are described in more detail in U.S. Pat. No. 6,207,754 which is incorporated herein by reference.

For many applications the adhesive blends will also contain one or more additives such as thermal stabilizers, antioxidants, UV inhibitors, processing aids, adhesion promotors and the like. These are commonly employed at very low levels, e.g., 50 to 10000 ppm.

Adhesive blends of the invention are prepared by melt blending the base resin, modified polyolefin and PPE, plus any optional components/additives, using conventional mixing methods. For example, all of the components can be combined, e.g., by dry blending, then and melt blended in a Banbury mixer or extruder. Adhesive blends produced in this manner can be pelletized and stored for subsequent use. Alternatively, the melt blends can be used directly for the manufacture of finished articles. Another approach, particularly useful in extrusion processes, is to separately feed the components into an extruder where they are melt blended and extruded. Masterbatches containing one or more of the components/additives may also be used. Masterbatch techniques facilitate incorporation of additives used at low levels and insures their uniform distribution in the adhesive blend with minimal processing.

Adhesive blends of the invention are highly versatile and can be utilized for widely diverse applications such as for bonding plastic, wood, glass, paper, composite and metal substrates. They are also highly suitable for use for lamination, extrusion and coextrusion, sheet extrusion/coextrusion, extrusion/coextrusion lamination, extrusion/coextrusion coating, blow molding, thermoforming, injection molding, rotational molding and the like.

In one highly useful application, the adhesive blends are used to bond polyolefins and metals such as aluminum, steel, copper, brass, stainless steel, galvanized steel and the like. They are particularly well suited for use as adhesive layers for multi-layer constructions wherein a polyolefin is "sandwiched" between two layers of metal. Structures of this type, e.g., metal/adhesive/polyolefin/adhesive/metal are widely used for construction panels, truck panels, signage and the like.

Compositions comprised of 60 to 80 wt. % HDPE, 5 to 25 wt. % PPE having an MFR of 2 to 20 g/10 min and 5 to 15 wt. % HDPE grafted with 1 to 4 wt. % maleic anhydride are particularly useful for metal bonding applications such as those described above. In another highly useful embodiment, these blends would also contain 5 to 25 wt. % ethylene-α-olefin plastomer. Blends having MIs from 2 to 20 g/10 min are particularly advantageous.

Adhesives of the invention are also well suited for use as tie layers for polyolefin/metal composite pipe and tubing. These are multi-layer constructions, most typically, five-layer composites of polyolefin/adhesive/metal/adhesive/polyolefin. Constructions of this type, used for a wide variety of heating and plumbing applications including, for example, hot and cold potable water installations, radiant floor heating systems, snow and ice melting systems for walks and driveways, compressed air supply lines, radiator connections and industrial and sanitary applications, must be capable of withstanding to repeated stresses caused by changes in temperature and pressure without delaminating.

Crosslinked PE (PEX) and aluminum are most commonly used for these applications, but copper and conventional PE are also utilized by some manufacturers. These constructions would have the structure PEX/adhesive/metal/adhesive/PEX or PE/adhesive/metal/adhesive/PE. Even though the metal provides most of the mechanical strength in these constructions, mechanical integrity and pressure ratings are dependent on the quality of the bond between the metal and PE. Failure of the PE or PEX to metal bond results in delamination, which usually takes the form of blister formation at the inner metal/tie-layer interface and severely detracts from the service life of the pipe.

In another highly useful embodiment, adhesive blends of the invention are utilized for bonding resins. This can be accomplished by coextrusion, extrusion lamination, heat sealing or by any other methods known for joining materials. They are widely used to adhere dissimilar polymer substrates, most notably, non-polar polyolefin substrates, e.g., PE, and polar substrates such as polyamides (nylons), ethylene-vinyl alcohol (EVOH) copolymers, polyesters, styrene polymers, polyurethanes and the like.

Whereas the above are often flexible structures, the present blends are also advantageously employed for rigid and semi-rigid constructions. Constructions of this type and which contain one or more structural layers are commonly used for food packaging or food storage applications. A typical construction of this type would comprise one or more food contact or sealing layers, a barrier layer and one or more structural layers. Food contact/sealing layers often comprise non-polar polyolefins, e.g., LDPE, while typical barrier layers comprise substrates of EVOH polyamides or the like.

Structural layers may comprise styrene polymers which may also contain rubber. High impact polystyrene (HIPS) is widely used as a structural layer, given its desirable physical properties, ease of extrusion processing, thermoforming and cutting. Applications of this type include, for example, fabrication of refrigerator liners that must have good barrier properties and resistance to stress cracking.

The following examples illustrate the invention; however, those skilled in the art will recognize numerous variations within the spirit of the invention and scope of the claims.

Adhesive blends of the examples were prepared using the following base resin (BR), propylene elastomer (PPE), modified polyolefin (MPO) and optional resin (OR) components:

BR-1  A LLDPE ethylene-butene-1 copolymer; density 0.918 g/cm³; MI 2 g/10 min
BR-2  HDPE; density 0.951 g/cm³; MI 12 g/10 min
BR-3  HDPE; density 0.953 g/cm³; MI 1.2 g/10 min -continued PPE-1  A propylene-ethylene copolymer elastomer containing >70 mole % propylene and having isotactic propylene crystallinity; density 0.855 g/cm³; MFR 3 g/10 min (Vistamaxx ™ 6100)
PPE-2  A propylene-ethylene copolymer elastomer containing >70 mole % propylene and having isotactic propylene crystallinity; density 0.860 g/cm³; MFR 3 g/10 min (Vistamaxx ™ 1100)
MPO-1  HDPE (density 0.953 g/cm³) grafted with 1.9 wt. % maleic anhydride; MI 9 g/10 min
MPO-2  An ethylene-octene-1 copolymer plastomer grafted with 1.9 wt. % maleic anhydride; MI 6 g/10 min
OR-1  An EPDM rubber; ethylene content 71 wt. % (Vistalon ™ 722)
OR-2  An EPR; ethylene content 69 wt. % (Nordel ™ 3722)
OR-3  An ethylene-octene-1 copolymer plastomer; density 0.860 g/cm³; MI 3.0 g/10 min (EXACT ™ 5361)
OR-4  An ethylene-octene-1 elastomer; density 0.865 g/cm³; MI 0.5 g/10 min (Engage ™ 8180)
OR-5  An ethylene-octene-1 copolymer plastomer; density 0.860 g/cm³; MI 0.7 g/10 min (EXACT ™ 5062)
STAB-1  A stabilizer comprised of 50/50 blend of a hindered phenol (IRGANOX ® 1010) and phosphate (IRGAFOS ® 168)

Adhesive blends utilized for the examples were prepared by melt blending the components using a ZSK30 twin screw extruder operating at 250 rpm with a die temperature of 220° C. The melt-blended extrudates were pelletized.

Example 1

An adhesive blend of the invention suitable for use as a tie-layer adhesive for barrier films was prepared. The blend contained 29.3 wt. % BR-1, 30 wt. % OR-3, 30 wt. % PPE-1, 10.5 wt. % MPO-2 and 0.2 wt. % STAB-1.

Evaluation as tie-layer adhesive: The above-prepared adhesive blend was utilized to make a 25 mil thick 5-layer LLDPE/adhesive/EVOH/adhesive/LLDPE film on a Killion coextrusion line. Melt temperatures used were 400° F. for the adhesive blend, 380° F. for the LLDPE and 390° F. for the EVOH. LLDPE used for the film was a commercially available ethylene-butene-1 copolymer (density 0.918 g/cm³ and MI 2 g/10 min). The EVOH was a commercially available resin having an ethylene content of 44 wt. % and MFR of 3.5 g/10 min. The 25 mil thick film was stretched in the machine direction at 115° C. to a thickness of 5 mils and irradiated at 5 megarads. Adhesion of the LLDPE to the EVOH was then measured in accordance with ASTM 1876. An adhesion value of 1.46 lbs/in was obtained.

Example 2

An adhesive blend was prepared in accordance with the invention comprising 69.26 wt. % BR-1, 10 wt. % PPE-1, 10.5 wt. % MPO-1, 10 wt. % OR-1 and 0.24 wt. % STAB-1. When evaluated as the tie-layer adhesive for a 5-layer barrier film, as described in Example 1, the adhesive strength was 1.39 lbs/in.

Comparative Example 3

To demonstrate the superior adhesion achieved with the adhesive blends of the invention containing propylene elastomers having isotactic propylene crystallinity, an adhesive blend was prepared following the procedure of Example 2 except that the PPE-1 was omitted. The comparative blend contained 69.26 wt. % BR-1, 10.5 wt. % MPO-1, 20 wt. % OR-1 and 0.24 wt. % STAB-1. Such a blend, formulated using only a conventional EPR, i.e., high ethylene content copolymer rubber, is representative of prior art adhesive blends. When evaluated in a 5-layer barrier film in accordance with the procedure of Example 1, the comparative adhesive blend had an adhesion value of only 0.73 lb/in—approximately half that achieved with the inventive blend of Example 2.

Example 4

An adhesive blend was suitable for use in rigid applications prepared by melt-blending 33.85 wt. % BR-1, 34 wt. % OR-4, 12 wt. % MPO-1, 20 wt. % PPE-2 and 0.15 wt. % STAB-1. Adhesion values obtained for the two films were 1.14 lbs/in and 0.68 lbs/in, respectively. For this example, 5-layer films were extruded on the Killion line. Two different films were produced. The first had the structure polystyrene/adhesive/EVOH/adhesive/polystyrene and the second utilized a 50/50 blend of polystyrene and high impact polystyrene (PS+HIPS) and had the structure PS+HIPS/adhesive/EVOH/adhesive/PS+HIPS. Both films were evaluated to determine adhesion at the styrene polymer/adhesive interface.

Example 5 and Comparative Example 6

Adhesive blends having the following compositions were prepared:

|  | Ex. 5 | Comparative Ex. 6 |
| --- | --- | --- |
| BR-2 (wt. %) | 69.9 | 69.9 |
| MPO-1 (wt. %) | 10 | 10 |
| PPE-1 (wt. %) | 20 | — |
| OR-2 (wt. %) | — | 20 |
| STAB-2 (wt. %) | 0.1 | 0.1 |

The above blends were evaluated for their ability to adhere epoxy primer coated steel to HDPE. For these evaluations a 2-layer steel/adhesive constructions were prepared by heat sealing a 3 mil cast film of the adhesive to the primer-coated steel sheet at 450, 475 and 500° F. for 3 seconds at 40 psi. Adhesion was then measured in accordance with ASTM D 1876 T-peel test.

Adhesion values obtained at the various seal temperatures were as follows:

|  | Ex. 5 | Comparative Ex. 6 |
| --- | --- | --- |
| 450° F. | 5.3 lbs/in | 1.5 lbs/in |
| 475° F. | 5.6 lbs/in | 2.8 lbs/in |
| 500° F. | 4.2 lbs/in | 2.2 lbs/in |

The above data clearly indicate the unexpected and markedly improved adhesion obtained with the adhesive blend of the invention containing the propylene-ethylene elastomer having isotactic propylene crystallinity versus the adhesive blend having a conventional high ethylene content EPR as the sole elastomeric component.

Example 7

Another adhesive blend useful for metal bonding was prepared comprising 69.9 wt. % BR-2, 10 wt. % OR-5, 10 wt. % MPO-1, 10 wt. % PPE-1 and 0.1 wt. % STAB-1. The resulting adhesive blend had a density of 0.935 g/cm$^3$ and MI of 4.9 g/10 min. When utilized to adhere steel sheet to a HDPE resin as described in Example 5, good adhesion was obtained at heat seal temperatures of 450° F. (4.1 lbs/in), 475° F. (4.9 lbs/in) and 500° F. (5.3 lbs/in). These adhesion values are markedly superior to those obtained using an adhesive blend wherein the PPE-1 was replaced with the same amount of a conventional EPR(OR-2). Adhesion results obtained for the adhesive blend formulated using OR-2 as the sole elastomeric component were 1.8 lbs/in (450° F.), 2.7 lbs/in (475° F.) and 3.7 lbs/in (500° F.).

Examples 8 and 9

Two additional adhesive blends suitable for metal bonding and having the following compositions were prepared in accordance with the invention.

|  | Ex. 8 | Ex. 9 |
| --- | --- | --- |
| BR-2 (wt. %) | 69.9 | — |
| BR-3 (wt. %) | — | 69.9 |
| OR-4 (wt. %) | 10 | — |
| MPO-1 (wt. %) | 10 | 10 |
| PPE-1 (wt. %) | 10 | 20 |
| STAB-1 | 0.1 | 01. |

Adhesion values (lbs/in) obtained when these blends were employed to heat seal steel to HDPE were as follows:

|  | Ex. 8 | Ex. 9 |
| --- | --- | --- |
| 450° F. | 3.9 | 4.0 |
| 457° F. | 3.8 | 4.2 |
| 500° F. | 4.9 | 4.7 |

Example 10

To demonstrate the versatility of the blends of the invention and the ability to obtain improved adhesion in a variety of metal bonding applications, 5-layer composite panels similar to those utilized in the construction industry and having a structure of Al/adhesive/LLDPE/adhesive/Al were prepared by heat sealing the layered components at 40 psi for 40 seconds at 350° F. and 400° F. The adhesive blend of Example 7 was used. Adhesion of the Al sheet to the LLDPE core was determined in accordance with ASTM D 1876. Adhesion values were 56 lbs/in and 82 lbs/in, respectively.

The foregoing examples clearly demonstrate the superior adhesion of the blends of the invention for a wide variety of bonding applications involving diverse substrates. Furthermore, while improved adhesion is achieved when PPE is the sole elastomeric component in the blend (see Example 5 and Comparative Example 6), significantly improved results can also be obtained by replacing a portion of other elastomeric components such as those employed in prior art blends with PPE. (See Example 2 and Comparative Example 3.)

We claim:
1. An adhesive blend consisting essentially of:
    (a) 25 to 85 weight percent, based on the total weight of the blend composition, polyolefin selected from the group consisting of high density polyethylene and linear low density polyethylene;
    (b) 2.5 to 25 weight percent, based on the total weight of the blend composition, high density polyethylene or linear low density polyethylene grafted with 0.5 to 4 weight percent maleic anhydride; and

(c) 2.5 to 40 weight percent, based on the total weight of the blend composition, propylene elastomer having a propylene content of 60 mole percent or greater and isotactic propylene crystallinity, density from 0.840 to 0.890 g/cm$^3$ and melt flow rate from 1 to 500 g/10 min (d) 5-25% of an ethylene alpha olefin copolymer plastomer.

2. The adhesive blend of claim 1 wherein (a) has a melt index from 0.01 to 400 g/10 min.

3. The adhesive blend of claim 2 wherein (a) is high density polyethylene having a density from 0.945 to 0.969 g/cm$^3$ and melt index from 0.1 to 200 g/10 min.

4. The adhesive blend of claim 2 wherein (a) is linear low density polyethylene having a density from 0.910 to 0.930 g/cm$^3$ and melt index from 0.1 to 200 g/10 min.

5. The adhesive blend of claim 2 wherein (c) contains 70 mole percent or greater propylene, has a density from 0.850 to 0.875 g/cm$^3$ and melt flow rate from 2 to 100 g/10 min.

6. The adhesive blend of claim 2 comprised of 40 to 80 weight percent (a), 4 to 20 weight percent (b) and 4 to 30 weight percent (c).

7. An adhesive blend consisting essentially of:
(a) 60 to 80 weight percent, based on the total weight of the blend composition, high density polyethylene,
(b) 5 to 15 weight percent, based on the total weight of the blend composition, high density polyethylene grafted with 1 to 4 weight percent maleic anhydride, and
(c) 5 to 25 weight percent, based on the total weight of the blend composition, propylene elastomer having a propylene content of 70 mole percent or greater and isotactic propylene crystallinity, density from 0.850 to 0.875 g/cm$^3$ and melt flow rate from 2 to 20 g/10 min; said adhesive blend having a melt index from 2 to 20 g/10 min.

8. The adhesive blend of claim 7 which additionally contains 5 to 25 weight percent ethylene-$C_{4-8}$ α-olefin copolymer plastomer.

9. A multi-layer film or sheet comprising a styrene layer and a tie-layer adhesively bonded thereto, said tie-layer comprising an adhesive blend consisting essentially of:
a) 25 to 85 weight percent, based on the total weight of the blend composition, polyolefin selected from the group consisting of high density polyethylene and linear low density polyethylene;
(b) 2.5 to 25 weight percent, based on the total weight of the blend composition, high density polyethylene or linear low density polyethylene grafted with 0.5 to 4 weight percent maleic anhydride and;
(c) 2.5 to 40 weight percent, based on the total weight of the blend composition, propylene elastomer having a propylene content of 60 mole percent or greater and isotactic propylene crystallinity, density from 0.840 to 0.890 g/cm$^3$ and melt flow rate from 1 to 500 g/10 min.

10. The multi-layer film or sheet of claim 9 further comprising a second polymer layer and wherein said tie-layer is disposed between the styrene layer and the second polymer layers.

11. The multi-layer film or sheet of claim 10 wherein the second polymer layer is a barrier resin layer.

12. A multi-layer film or sheet comprising a metal layer and a tie-layer adhesively bonded thereto, said tie-layer comprising an adhesive blend consisting essentially of:
a) 25 to 85 weight percent, based on the total weight of the blend composition, polyolefin selected from the group consisting of high density polyethylene and linear low density polyethylene;
(b) 2.5 to 25 weight percent, based on the total weight of the blend composition, high density polyethylene or linear low density polyethylene grafted with 0.5 to 4 weight percent maleic anhydride; and
(c) 2.5 to 40 weight percent, based on the total weight of the blend composition, propylene elastomer having a propylene content of 60 mole percent or greater and isotactic propylene crystallinity, density from 0.840 to 0.890 g/cm$^3$ and melt flow rate from 1 to 500 g/10 min.

13. The multi-layer film or sheet of claim 10 wherein the second polymer layer is a polyolefin layer.

14. The multi-layer film or sheet of claim 12 further comprising a polymer layer and wherein said tie-layer is disposed between the metal layer and the polymer layer.

15. The multi-layer film or sheet of claim 14 wherein the polymer layer is a polyolefin selected from the group consisting of high density polyethylene and linear low density polyethylene.

* * * * *